United States Patent [19]

Reber

[11] Patent Number: 4,906,224
[45] Date of Patent: Mar. 6, 1990

[54] INVERTED TOOTH CHAIN

[75] Inventor: Reiner F. Reber, Richmond Hill, Canada

[73] Assignee: Magna International, Inc., Markham, Canada

[21] Appl. No.: 313,532

[22] Filed: Feb. 22, 1989

[51] Int. Cl.$^4$ .............................................. F16G 13/04
[52] U.S. Cl. .................................... 474/213; 474/214
[58] Field of Search ............................ 474/213—217, 474/153, 155, 156; 59/84, 88

[56] References Cited

U.S. PATENT DOCUMENTS

| | | | |
|---|---|---|---|
| 1,488,710 | 4/1924 | Ramsey | 474/215 |
| 1,578,271 | 3/1926 | Dull et al. | 474/214 |
| 2,223,314 | 11/1940 | Cumfer | 474/213 X |

Primary Examiner—Thuy M. Bui
Attorney, Agent, or Firm—Aubrey L. Burgess

[57] ABSTRACT

A chain constructed of alternating groups of fine blanked articulating links and sets of guide and connecting links. The sets and groups of links are joined by pivot members, journaled in smooth walled openings in the articulating links and press-fit into the openings in the guide and connecting links. The articulating links are of the silent variety with a pair of toes spaced by a crotch with the defining flanks of the toes being adaptable for drivingly contacting the teeth of sprockets. To provide the smooth walled openings in the articulating links, these links are fine blanked as opposed to being conventionally blanked.

8 Claims, 2 Drawing Sheets

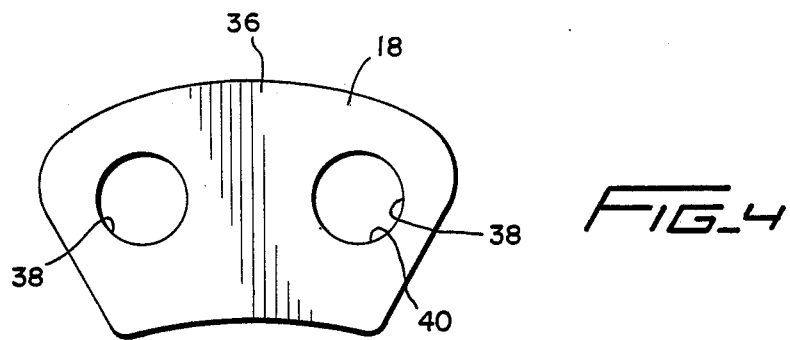
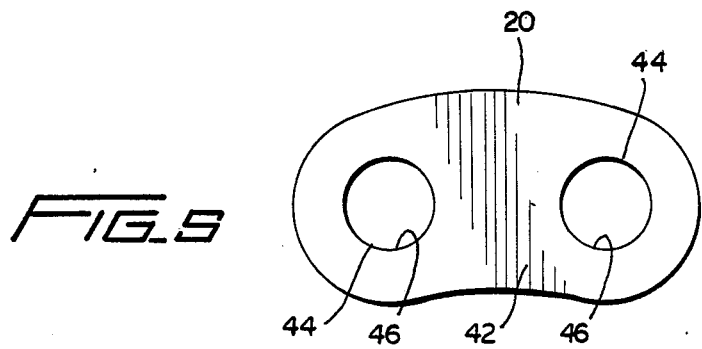
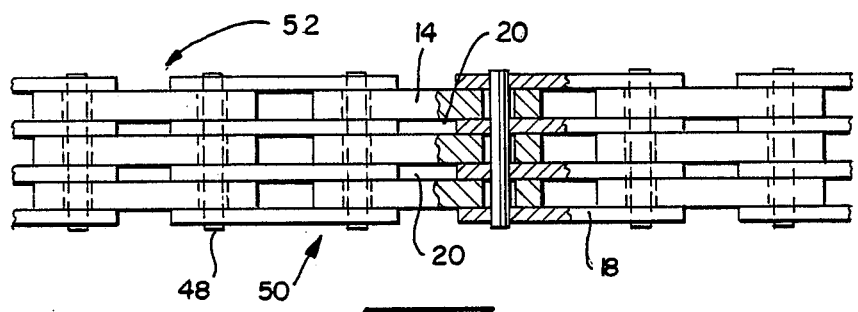

INVERTED TOOTH CHAIN

BACKGROUND OF THE INVENTION

1. Field of Invention

This invention relates to improved inverted tooth chain especially adapted for automotive use, such as for timing chains; the chain, however is adaptable for other power transmission applications.

2. Background Discussion

Inverted tooth chains are well known in the art and many are especially adaptable for automotive use, such as for timing chains. Many timing chains are of the roller chain construction, as well known in the art. These chains mesh wit sprockets with their rollers drivingly engaging the flanks of the sprocket teeth. Other chains for the same purpose are of the "silent" or inverted tooth variety, comprising a plurality of interleaved sets of links, each set of links being joined to the next adjacent set of links by a pivot means, such, for example, a round pin or a multiple piece rocker joint. The various types of pivot means are well known in the chain art and need no further description.

The links of silent or inverted tooth chain are constructed with a body having a pair of spaced openings to receive the pivot means, and a pair of depending toes separated by a crotch. The toes are defined by diverging inside and outside flanks, the flanks usually drivingly contacting the teeth of the sprockets in the drive in which the chain is used. Guide links flanking the outsides of the links of the chain or located centrally thereof serve to maintain meshing engagement of the chain with the sprockets. The guide links are placed are shaped to avoid any driving contact with the sprocket teeth. In any event, the pitch of all links is the same.

Customarily, the links of a chain are stamped or blanked at relatively high rates of speed from metal strip and later treated to insure the proper hardness of the links. The pivot means can be cord wood cut from an extruded metal shape and then hardened to improve the wearing characteristics of the part and thus the finished chain. The chain is assembled in a continuous length with specific lengths being "broken" out, and the ends of each length being joined to complete the loop. Various methods are used to maintain the sets of links in the assembled chain, as for example upsetting or peening over of a joint members at their ends, such methods being well known in the chain art.

When the links are customarily blanked, they are literally sheared from the strip material and the openings therethrough which receive the joint means, are likewise produced by the shearing action, resulting in an openings with walls that have a rough surface. Relative rotation between a joint member and such an opening causes the pin to rapidly wear, thus reducing the life of the chain.

BRIEF SUMMARY OF THE INVENTION

An improved inverted tooth chain having an improved weight/life ratio will be described; the chain has fewer parts that the usual chains for the same application, and provides improved bearing areas for the joint means resulting in better wear characteristics than prior art chains.

The chain of this invention comprises alternating groups or sets of inverted tooth links and sets or groups of guide links and at least one connecting link, the inverted tooth links are articulating links and provide smooth walled openings for in which the pivot means is journaled. The articulating links are preferably double the thickness of the guide links or the connecting link, and are fine blanked, to provide the smooth walled openings to receive the joint means. The connecting and guide links are conventionally blanked. The pivot means, as indicated heretofore, are journaled for rotation in the articulating link openings and are press fit into openings in the guide links and the connecting links, so as not rotate with respect to those links.

The inverted tooth articulating links, have diverging flanks defining their toes which drivingly contact the teeth of sprockets with which the chain meshes. Because of the arrangement of the links in the chain of this invention, bending of the pivot means is avoided, the links providing a balanced load distribution on the joint means counteracting joint deformation.

DESCRIPTION OF THE DRAWINGS

FIG. 4 is a view of a typical guide link as used in the chain portion of FIG. 1;

FIG. 5 is an elevational view of a connecting link as used in the chain of FIGS. 1 and 2; and FIG. 6 is a top view of a portion of an alternative chain constructed according to the invention.

DETAILED DESCRIPTION OF THE PREFERRED EMBODIMENTS

Figure 1:
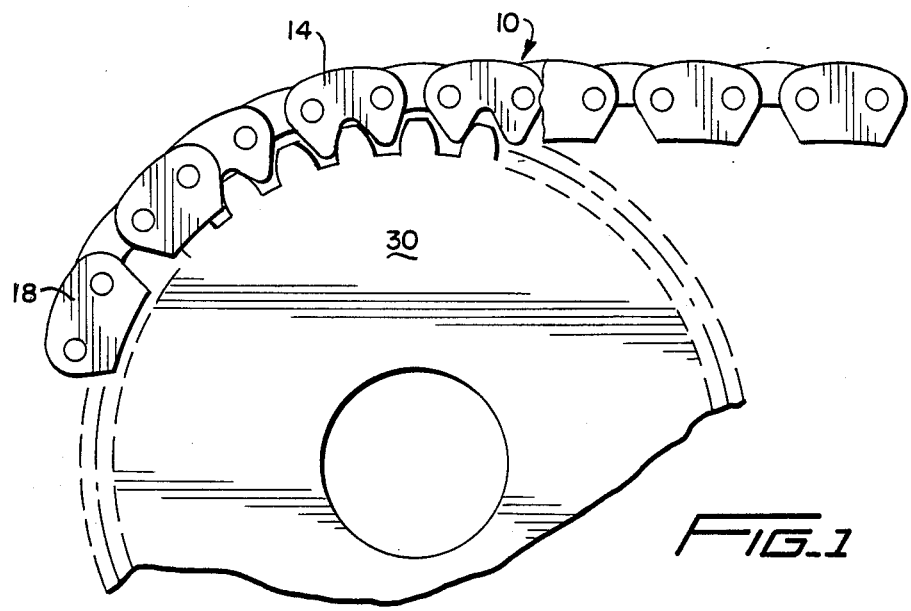
FIG. 1 is a side view of a portion of a chain constructed according to this invention and showing in broken lines a sprocket with which the chain meshes.
Figure 2:
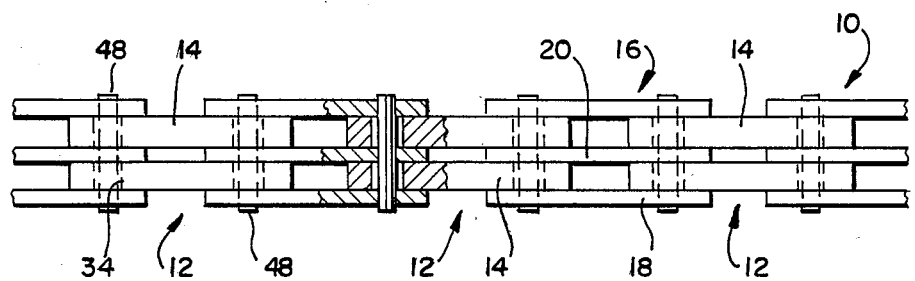
FIG. 2 is a top view of the portion of chain constructed as in FIG. 1, with parts broken away.
Figure 3:
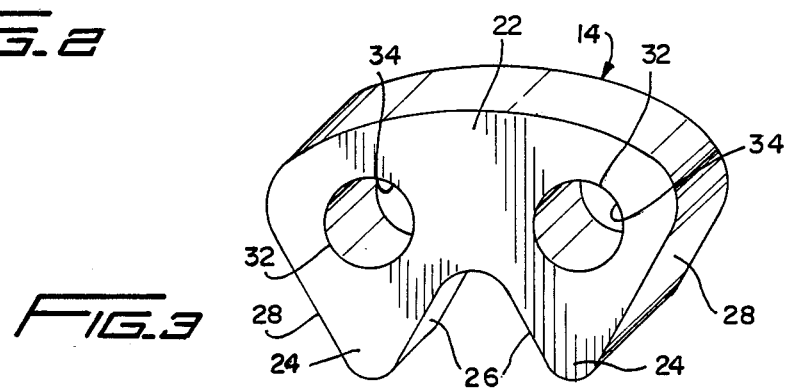
FIG. 3 an elevational view of an articulating link as used in the chain portion of FIGS. 1 and 2.

The chain 10 of this invention is constructed, as illustrated in FIGS. 1 and 2 of the drawings, of a plurality of sets or groups 12 of articulating links 14 alternating with a groups or sets 16 of links comprising a pair of guide links 18 which flank the outside of the chain 10 and a connecting link 20 which is centrally disposed between the links 14. Each link 14 has a body 22 and a pair of toes 24, each defined by an inside flank 26 and an outside flank 28. The flanks 26 and 28 can be straight or curved without departing from the spirit of the invention, so long as the flanks drivingly engage the teeth of a sprocket 30 in the overall drive arrangement. Each link 14 also is fine blanked with a pair of spaced openings 32, each defined by a smooth wall 34.

Each guide link 18 has a body 36 and a pair of spaced openings 38 therein. Because these links are conventionally blanked, each wall 40 defining an opening 38 is somewhat rough, indicating that the opening 38 was formed primarily by a shearing action. Each connecting link 20 has a body 42 and a pair of spaced openings 44 therein. These links are conventionally blanked, and thus each wall 46 defining an opening 44 is somewhat rough, indicating that the opening was formed primarily by a shearing action. Each connecting link 20 is so shaped that it will not drivingly engage the teeth of a sprocket in the drive arrangement.

Pivot means 48, shown as round pins, are used to connect the alternate sets or groups of links, and permit the articulation of the chain about the pivot means. Each pin means 48 is journaled in the openings 32 of each pair of links of the sets 12 of links 14 such that relative rotation between the links 14 and the pins 48 occurs. The pin which is journaled in the links 14 is press fit in the opening 44 in the adjacent connecting link and also in the openings 38 in the guide links of the set of guide and connecting links, so that no relative rotation between the pin and the guide and connecting links occurs.

The chain 50 illustrated in FIG. 6 differs from that illustrated in FIGS. 1 and 2 in that the articulating sets 52 of links 14 comprise three links, with a connecting link 20 between each adjacent link and guide links 18 flanking the sides of the chain. According to the invention, the width of the chain can be changed so long as a connecting link 20 is placed between each adjacent articulating link 14.

As can be appreciated, the bearing area for each pin, i.e., the area of the walls defining the openings in the articulating links, provides an improved load distribution on the pivot means counteracting any deformation of the pin and, also, because of the improved journal provided by the smooth walls of the openings in the articulating links, results in better wear characteristics than in the ordinary chain of the prior art.

The central connecting links are so shaped to avoid all contact with sprocket teeth and do not therefore load relatively high area pressure on the sprocket teeth, resulting in longer sprocket life because of the reduction in wear caused by the absence of impact with the connecting links.

The appended claims are intended to cover all reasonable equivalents and are to be give the broadest interpretation as permitted by the prior art.

I claim:

1. A chain comprising sets of interlaced links joined by pivot means passing through aligned openings in the sets of links, alternate sets of links being articulating links with their openings being fine blanked to present smooth walls and permitting relative movement between the pivot means and the articulating links, said articulating links having a plurality of diverging flanks defined by a pair of toes spaced by a crotch and being constructed to drivingly engage teeth of sprockets, the other sets of links being guide and connecting links, said guide links flanking the outside of the articulating links to maintain the chain on the sprocket, said connecting links being so shaped to avoid contact with sprocket teeth, the pivot means being shaped to avoid contact with sprocket teeth, the pivot means being press-fit into openings on said guide and connecting links.

2. A chain for use with toothed sprockets comprising the combination of groups of articulating links alternating with sets of guide and connecting links, and a pivot means journaled in transversely aligned openings in said articulating links for relative rotation therewith and fixed in said guide and connecting links, each articulating link being on the order of two times the thickness of each guide and connecting link, said articulating links being formed with a pair of toes separated and spaced by a crotch, said toes being defined by diverging flanks at least some of which are adapted to drivingly contact teeth of sprockets, said articulating links being fine blanked to present generally smooth walled openings for said pivot means, said guide links flanking the sides of said groups of articulating links and said connecting links being placed between each adjacent articulating link in each group.

3. A chain as recited in claim 2, wherein each connecting link is provided with a pair of spaced openings and a pivot means is press-fit into each opening.

4. A chain as recited in claim 2, wherein the pitch of said articulating links is the same as the pitch of the guide and connecting links.

5. A chain as recited in claim 2, in which said connecting links are shaped to avoid driving contact with sprocket teeth.

6. A chain as recited in claim 2, wherein each group of articulating comprises at least two links.

7. A chain comprising alternating sets of links of one type which are adapted to drivingly engage the teeth of sprockets and sets of links of other types of links, said other types of links comprising guide links flanking the articulating links at their sides and a link spacing one articulating link of a set from another articulating link of the set, each link of both sets of links having spaced openings with the openings in said sets of links being transversely aligned as sets of openings with the openings of one set of openings being transversely aligned with a set of openings in the other set of links, a joint means in each transversely aligned openings of the sets of links, the openings in said articulating links being fine blanked to provide a smooth walled bearing journal for said joint means, and the openings n the other links snugly receiving the pivot means in such a manner to avoid relative rotation of said joint means and the other links.

8. An inverted tooth chain adapted for driving engagement with a toothed sprocket comprising:
 a plurality of spaced sets of articulating links of a given thickness with each set composed of at least a pair of transversely aligned links, each having a pair of toes defined by diverging flanks and spaced by a crotch with at least some of said flanks adapted to drivingly contact the teeth of said sprocket;
 guide links flanking the sides of said sets of articulating links and bridging the space between the next adjacent sets of articulating links;
 a pair of spaced openings in each link of said sets of links and said guide links;
 joint means in said openings connecting said sets of links and said guide links with said joint means being journaled in said articulating links;
 connecting links shaped to avoid contact with said sprocket teeth coextensive with said guide links and located between the links of said sets of links;
 each connecting link and each guide link being fixed to said joint means;
 the thickness of said guide links and said connecting links each being less than the thickness of said articulating links;
 said articulating links being fine blanked to thus provide together with the thickness thereof an improved journal for said joint means to thus improve the wear characteristics of the chain.

* * * * *